(12) United States Patent  
Gou

(10) Patent No.: US 11,312,641 B2
(45) Date of Patent: Apr. 26, 2022

(54) ELECTROMAGNETIC IONIC LIQUID AND PREPARATION METHOD THEREFOR

(71) Applicant: HOWHIGH SCIENCE & TECHNOLOGY (HANGZHOU) CO., LTD., Zhejiang (CN)

(72) Inventor: Jiuzhou Gou, Zhejiang (CN)

(73) Assignee: HOWHIGH SCIENCE & TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 17/270,758

(22) PCT Filed: Nov. 30, 2018

(86) PCT No.: PCT/CN2018/118544
§ 371 (c)(1),
(2) Date: Feb. 23, 2021

(87) PCT Pub. No.: WO2020/037871
PCT Pub. Date: Feb. 27, 2020

(65) Prior Publication Data
US 2021/0246047 A1 Aug. 12, 2021

(30) Foreign Application Priority Data

Aug. 24, 2018 (CN) .................. 201810974762.X

(51) Int. Cl.
*C01B 25/45* (2006.01)
*C02F 1/26* (2006.01)
(Continued)

(52) U.S. Cl.
CPC ............ *C02F 1/265* (2013.01); *C01B 25/451* (2013.01); *C05B 7/00* (2013.01); *C02F 2101/105* (2013.01); *C02F 2103/08* (2013.01)

(58) Field of Classification Search
CPC .. C01B 25/451; C02F 1/265; C02F 2101/105; C02F 2103/08; C02F 1/5272;
(Continued)

(56) References Cited

U.S. PATENT DOCUMENTS

2004/0141876 A1* 7/2004 Paskalov .................. C02F 1/48
422/22
2021/0246026 A1* 8/2021 Gou ....................... C02F 1/385

FOREIGN PATENT DOCUMENTS

CN 101970360 A 2/2011
CN 102020256 A 4/2011
(Continued)

OTHER PUBLICATIONS

International Search Report dated Apr. 23, 2019 in corresponding PCT Application PCT/CN2018/118544, with English translation, 6 pages.

(Continued)

*Primary Examiner* — Hayden Brewster
(74) *Attorney, Agent, or Firm* — Muncy, Geissler, Olds & Lowe, PC

(57) ABSTRACT

The disclosure provides an electromagnetic ionic liquid, which consists of ammonia water, diluent, EWT electronic water and macromolecular complex. The four components are mixed evenly at normal temperature and pressure in a certain proportion to prepare the electromagnetic ionic liquid. The electromagnetic ionic liquid can be used for extracting struvite from seawater, salt water or brine, which improves quality of the struvite, facilitates its industrial production and improves yield of struvite products. In addition, with the electromagnetic ionic liquid, elements required for crop growth and dozens of types of trace elements can be captured in the precipitate, which has great (Continued)

social and economic value for mass production, popularization and application of the struvite.

5 Claims, 1 Drawing Sheet

(51) Int. Cl.
*C05B 7/00* (2006.01)
*C02F 101/10* (2006.01)
*C02F 103/08* (2006.01)

(58) Field of Classification Search
CPC ...... C02F 1/56; C02F 1/385; C02F 2001/007; C02F 1/5236; C02F 9/00; C02F 2101/10; C05B 7/00; Y02A 40/20; C05F 3/02; C01P 2006/80
USPC .......................................... 210/181; 252/181
See application file for complete search history.

(56) References Cited

FOREIGN PATENT DOCUMENTS

| | | |
|---|---|---|
| CN | 102092871 A | 6/2011 |
| CN | 102455285 A | 5/2012 |
| CN | 102874784 A | 1/2013 |
| CN | 104401956 A | 3/2015 |
| CN | 204752863 U | 11/2015 |
| CN | 106830416 A | 6/2017 |
| CN | 109020630 A | 12/2018 |
| WO | 2007023170 A1 | 3/2007 |

OTHER PUBLICATIONS

Notification to Grant Patent Right for Invention dated Jul. 30, 2019 in corresponding CN Application 201810974762.X, with English translation, 3 pages.

Supplementary Search dated Jul. 19, 2019 in corresponding CN Application 201810974762.X, 1 page.

Second Office Action dated Jun. 25, 2019 in corresponding CN Application 201810974762.X, with English translation, 7 pages.

First Office Action dated Apr. 15, 2019 in corresponding CN Application 201810974762.X, with English translation, 8 pages.

Search Report completed April 7, 2019 in corresponding CN Application 201810974762.X, 2 pages.

Xu et al., Electronic water treatment technology, Industrial Water Treatment, Aug. 2009, pp. 1-5, vol. 29, No. 8.

Piyadasa et al., The application of electromagnetic fields to the control of the scaling and biofouling of reverse osmosis membranes—A review, Desalination, Sep. 15, 2017, pp. 19-34.

Catli. Studying Electric Field Effect on Water by Analysing the instrument "hydronic", Univ. of Trento, Jan. 2009, pp. 1-47, Italy.

Hulle et al., Practical Assessment of Electronic Water Treatment for the Prevention of Fouling, Chem. Eng. Technol., 2007, pp. 659-662, 30, No. 5.

Song, Study on Energy-saving Electronic Water Treatment Facility with Automatically Adjustable Operating Voltage, Applied Mechanics and Materials, 2014, pp. 770-775, vols. 511-512, Trans Tech Publications, Switzerland.

Doelman, Preventing Rust Formation with Electronic Water Treatment, Modern Pumping Today, Maintenance Solutions, Jan. 2015, pp. 24-27, www.modernpumpingtoday.com.

* cited by examiner

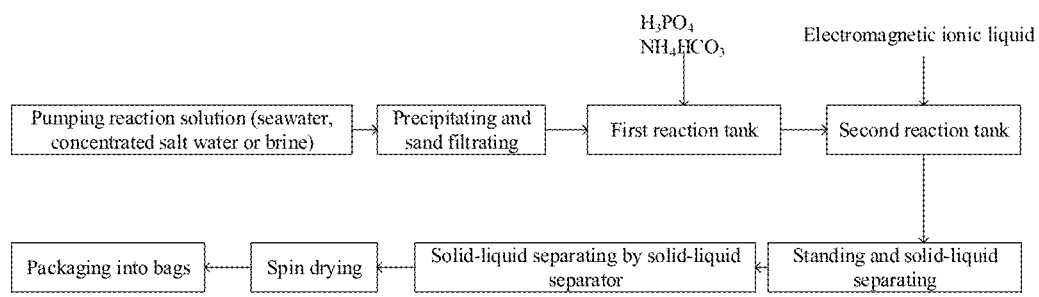

ELECTROMAGNETIC IONIC LIQUID AND PREPARATION METHOD THEREFOR

TECHNICAL FIELD

The disclosure relates to a field of chemical industry, in particular to an electromagnetic ionic liquid and a preparation method therefor. The electromagnetic ionic liquid is used for extracting struvite from seawater, salt water or brine.

BACKGROUND ART

Struvite is a type of ore, also known as accumulated birds' or animals' feces. Natural struvite is formed by the accumulated feces and corpses of birds, bats or seals, and can be used as a high-quality fertilizer. A main component of the struvite is Ammonium Magnesium Phosphate Hexahydrate ($MgNH_4PO_4.6H_2O$). Ammonium magnesium phosphate hexahydrate is a white powder with a relative density of 1.711, which is a compound slow-release fertilizer containing nitrogen, phosphorus, magnesium and other elements. The ammonium magnesium phosphate hexahydrate has a low solubility in water, and is slowly decomposed through nitrification with microorganisms under a suitable soil temperature condition to provide nutrients for plants. With characteristics of slow release and difficult leaching of the ammonium magnesium phosphate hexahydrate, the struvite is especially suitable for fertilizing plants growing in sandy soil with magnesium deficiency and ease of nutrient leaching and/or growing in high temperature and rainy regions with magnesium deficiency. In addition, the struvite is especially suitable for fertilizing crops in inland areas around lakes, which presents broad application prospects for reducing lake agricultural non-point source pollution and improving lake eutrophication. China is a large agricultural country with many inland lakes and serious agricultural non-point source pollution, and thus it is undoubtedly of great social and economic value to popularize and apply the struvite.

The natural struvite is a scarce resource, which needs two thousand years to be formed under action of specific natural environment. Currently, the struvite with ammonium magnesium phosphate hexahydrate as its main component can be extracted from wastewater of a sewage treatment plant, of a garbage dump, and of a livestock and poultry farm, or from sludge. However, the struvite extracted with industrial technologies lacks other trace elements required for plant growth.

However, it is relatively difficult to extract the struvite from the seawater, because it contains a large number of divalent and more polyvalent metal ions, and it is easy to generate flocculent precipitates such as $Ca(OH)_2$ and $Ca(H_2PO_4)_2$ in an extraction reaction.

SUMMARY

The disclosure aims to provide an electromagnetic ionic liquid, which solves problems in the prior art that it is difficult to extract struvite from seawater and it is easy to generate flocculent precipitates.

To solve the above problems, the present disclosure provides an electromagnetic ionic liquid, which consists of following components in parts by weight:

18.5%-48.1% of ammonia water with a concentration of 10%-26%, 47.9%-77.5% of diluent, 1.6% of EWT electronic water with $-300$ mv$\leq$ORP$\leq-1000$ mv and pH$\geq$13, 2.4% of complexing agent.

According to an embodiment of the disclosure, the diluent is distilled water.

According to an embodiment of the present disclosure, the complexing agent is selected from one or more of potassium citrate, sodium citrate, potassium silicate, sodium silicate or EDTA.

The disclosure further provides a method for preparing an electromagnetic ionic liquid, which includes following steps: mixing following components in parts by weight to form the electromagnetic ionic liquid:

18.5%-48.1% of ammonia water with a concentration of 10%-26%, 47.9%-77.5% of diluent, 1.6% of EWT electronic water with $-300$ mv$\leq$ORP$\leq-1000$ mv and pH$\geq$13, 2.4% of complexing agent.

According to an embodiment of the present disclosure, the complexing agent is selected from one or more of potassium citrate, sodium citrate, potassium silicate, sodium silicate or EDTA.

According to an embodiment of the disclosure, in a process of preparing the electromagnetic ionic liquid, the diluent, the complexing agent, the EWT electronic water and the ammonia water are sequentially added into a container.

According to an embodiment of the present disclosure, the electromagnetic ionic liquid is prepared and stored hermetically in an insulating container which insulates oxygen and air.

According to an embodiment of the disclosure, the electromagnetic ionic liquid is stored at normal temperature and pressure in a ventilated, sun-shading and light-shielding site.

Compared with the prior art, the technical scheme has the following advantages:

According to the disclosure, the ammonia water, the diluent, the EWT electronic water and the complexing agent are mixed in proportion to prepare the electromagnetic ionic liquid, which can be used for extracting the struvite from the seawater, salt water or brine. The electromagnetic ionic liquid has strong permeation, complexing and dispersing capabilities and good oxidation resistance property and has a high pH value, and it can maintain pH value of reaction solution stable under certain conditions, which facilitates generation of the struvite. A large number of free anions in the electromagnetic ionic liquid adhere to surfaces of precipitate particles, which makes the particles repel each other, and thus with this strong dispersion and anti-precipitation, flocculent precipitates such as $Ca(OH)_2$ and $Ca(H_2PO_4)_2$ can be avoided during the reaction, which facilitates the extraction reaction of the struvite and improves yield of struvite products.

In addition, the large number of free anions in the electromagnetic ionic liquid can form a stable complex with divalent or more polyvalent metal cations in the seawater, salt water or brine, so as to capture elements required for crop growth and various trace elements, so that the prepared struvite contains potassium, calcium, sulfur and chlorine required for the crop growth and dozens of types of trace elements such as molybdenum, zinc, manganese, iron, copper and selenium, in addition to the magnesium ammonium phosphate hexahydrate ($MgNH_4PO_4.6H_2O$).

BRIEF DESCRIPTION OF THE DRAWINGS

The sole FIGURE is a process flow chart of preparing struvite by using the electromagnetic ionic liquid according to the disclosure.

DETAILED DESCRIPTION

The following description is only intended to disclose the present invention so as to enable those skilled in the art to implement the invention. The embodiments in the following description are by way of example only, and other obvious variations will occur to those skilled in the art. The basic principle of the invention defined in the following description can be applied to other implementations, modified, improved and equivalent schemes and other schemes without departing from the spirit and scope of the utility model.

The disclosure provides an electromagnetic ionic liquid for extracting struvite from seawater, salt water or brine. The electromagnetic ionic liquid is a mixture consisting of the following components in parts by weight:

18.5%-48.1% of ammonia water with a concentration of 10%-26%, 47.9%-77.5% of diluent, 1.6% of EWT electronic water with $-300$ mv$\leq$ORP$\leq-1000$ mv and pH$\geq$13, 2.4% of complexing agent.

Specifically, the electromagnetic ionic liquid is prepared by directly mixing the ammonia water, the diluent, the Electronic water treatment (EWT) electronic water and the complexing agent in proportion, and there is no chemical reaction after mixing the ammonia water, the diluent, the EWT electronic water and the complexing agent.

The EWT electronic water is an aqueous solution obtained through EWT technology. The EWT technology is a new water treatment technology developed after 1970s, which was first successfully developed by NASA. The electronic water treatment technology can be widely used in the water supply treatment of industrial and civil cold and/or hot water circulation systems, and has good scale prevention and scale removal, bacteria and algae removal, corrosion inhibition and prevention property, and enables good energy and water saving. A range of an oxidation-reduction potential (ORP) of the EWT electronic water is $-300$ mv$\leq$ORP$\leq-1000$ mv, and its pH value is equal to or more than 13. The ORP, as a comprehensive index of medium (including soil, natural water, culture medium, etc.) environmental conditions, represents relative degree of oxidizability or reducibility of the medium, with a unit of my (millivolt).

Furthermore, the diluent is distilled water, and the complexing agent is selected from one or more of potassium citrate, sodium citrate, potassium silicate, sodium silicate or ethylenediaminetetraacetic acid (EDTA).

The disclosure further provides a method for preparing an electromagnetic ionic liquid, which includes following steps: mixing following components in parts by weight to form the electromagnetic ionic liquid:

18.5%-48.1% of ammonia water with a concentration of 10%-26%, 47.9%-77.5% of diluent, 1.6% of EWT electronic water with $-300$ mv$\leq$ORP$\leq-1000$ mv and pH$\geq$13, 2.4% of complexing agent.

The diluent is a distilled water, and the complexing agent is selected from one or more of potassium citrate, sodium citrate, potassium silicate, sodium silicate or EDTA.

In preparing, firstly a container, such as a plastic or a glass container, with an insulated inner wall is selected, and the inner wall of the container is washed with clean water and dried. In preparing the electromagnetic ionic liquid, the diluent, the complexing agent, the EWT electronic water and the ammonia water are sequentially added into the container.

In this embodiment, the complexing agent includes sodium silicate, potassium citrate and EDTA, and a concentration of the ammonia water is 26%. Taking preparation of 100 g of the electromagnetic ionic liquid as an example, it is required to add 77.5 g of the diluent (distilled water), 1.4 g of sodium silicate, 0.5 g of potassium citrate, 0.5 g of EDTA, 1.6 g of the EWT electronic water, and finally 18.5 g of the ammonia water with a concentration of 26% into the container sequentially, and all the components should be evenly stirred, sealed and stored indoors at normal temperature and pressure to avoid sunlight or heat.

In preparing the electromagnetic ionic liquid, a proportion of the ammonia water varies with that of the diluent, and the concentration of the ammonia water changes accordingly. For example, when the weight ratio of the diluent in the electromagnetic ionic liquid is 47.9%, the weight ratio of ammonia water is 48.1% and the concentration of the ammonia water is adjusted to 10% accordingly.

It should be noted that the electromagnetic ionic liquid is prepared and stored hermetically in an insulating container which insulates oxygen and air. For example, the electromagnetic ionic liquid is stored at normal temperature and normal pressure in a ventilated, sun-shading and light-shielding site.

The prepared electromagnetic ionic liquid contains a large amount of free anions, and has strong permeation, complexing and dispersing capabilities and good oxidation resistance property and has a high pH value.

The sole FIGURE shows a process flow of extracting the struvite from any one of the seawater, salt water or brine by using the electromagnetic ionic liquid. The salt water includes but is not limited to waste water after salt production and salt water after seawater desalination. Brine includes but is not limited to underground brine and waste brine after bromine production. For ease of explanation, this embodiment only takes extracting the struvite from the seawater as an example to illustrate working mechanism of the electromagnetic ionic liquid according to the present disclosure.

A process for extracting the struvite from the seawater by using the electromagnetic liquid includes following steps:

1) pumping 100 m³ seawater of Bohai by a water pump, with contents of $Mg^{2+}$ and $Ca^{2+}$ in the seawater being 1080 ppm and 350 ppm, respectively. The pumped seawater is placed in a sedimentation tank for standing to remove coarse sediment, and then passed through a sand filtration device to remove impurities and fine sediment in seawater.

2) transferring the seawater after sand filtration to a first reaction tank, and adding $NH_4HCO_3$ and $H_3PO_4$ in an amount corresponding to the content of $Mg^{2+}$ in the seawater. For example, in this embodiment, according to the contents of $Mg^{2+}$ in the seawater, it is required to add 358 kg of $NH_4HCO_3$ with purity of 96% and 502 kg of $H_3PO_4$ solution with concentration of 85% to the first reaction tank. $NH_4HCO_3$, $H_3PO_4$ and the seawater are stirred and well mixed to react as follows:

$$NH_4HCO_3 + H_3PO_4 \rightarrow NH_4H\,PO_4 + CO_2 + H_2O$$

3) pumping the reaction solution containing the seawater in the first reaction tank into the second reaction tank by a water pump, slowly stirring the reaction solution in the second reaction tank and dripping the electromagnetic ionic liquid at the same time, with a dripping time controlled to be 40 min and pH value of the reaction solution in the second reaction tank to be 8.0 to 8.5, a following reaction occurring and white precipitate being generated:

$Mg^{2+}+NH_4^++PO_4^{3-}+6\ H_2O \rightarrow MgNH_4PO_4 \cdot 6H_2O$

The electromagnetic ionic liquid has strong permeation, complexing and dispersing capabilities, has good oxidation resistance property and a high pH value, and does not participate in the reaction in the reaction liquid for extracting the struvite, so the pH value of the reaction liquid can be maintained stable under certain conditions, which facilitates the generation of the struvite. The large number of free anions in the electromagnetic ionic liquid adhere to surfaces of precipitate particles, which makes the particles repel each other, and thus with this strong dispersion and anti-precipitation, flocculent precipitates such as $Ca(OH)_2$ and $Ca(H_2PO_4)_2$ can be avoided during the reaction, which facilitates the extraction reaction of the struvite and improves yield of struvite products. In addition, the free anions in the electromagnetic ionic liquid can form a stable complex with divalent or more polyvalent metal cations in the seawater, salt water or brine, so as to capture elements required for crop growth and various trace elements in the precipitate, so that the prepared struvite contains potassium, calcium, sulfur and chlorine required for the crop growth and dozens of types of trace elements such as molybdenum, zinc, manganese, iron, copper and selenium, in addition to the magnesium ammonium phosphate hexahydrate ($MgNH_4PO_4 \cdot 6H_2O$).

4) separating the white precipitate by solid-liquid separation to obtain the struvite. Specifically, after stopping the stirrer in the second reaction tank and standing for 30 min, the white precipitate is separated from supernatant of the reaction liquid in the second reaction tank, and in this step large-particle white precipitates which sink at a bottom of the reaction liquid can be obtained. Then, the supernatant and white precipitate in the reaction solution in the second reaction tank are separated from each other by a solid-liquid separator, and in this step the white precipitates suspended in the reaction solution with smaller particle sizes can be further obtained.

5) spin-drying the white precipitate by a centrifuge, for example, spin drying the white precipitate by a centrifuge with 300-500 mesh filter cloth to get water content of the white precipitate less than 8%, and packaging the dewatered struvite into bags by an automatic packaging machine according to specifications.

In this embodiment, according to the above operation, about 1.3 tons of the struvite can be produced in 100 m³ seawater of Bohai.

The main elements and trace elements in the struvite prepared by the above method are shown in the following table:

| Serial Number | Element | Content (%) | Remarks |
|---|---|---|---|
| 1 | C | 1.65 | |
| 2 | O | 43.03 | |
| 3 | Na | 3.68 | |
| 4 | Mg | 7.367 | |
| 5 | Al | 0.114 | |
| 6 | Si | 29.56 | |
| 7 | S | 0.722 | |
| 8 | Cl | 12.29 | |

-continued

| Serial Number | Element | Content (%) | Remarks |
|---|---|---|---|
| 9 | K | 0.642 | |
| 10 | Ca | 0.579 | |
| 11 | Ti | 0.011 | |
| 12 | Mn | 0.098 | |
| 13 | Fe | 0.0417 | |
| 14 | Cu | 0.0073 | |
| 15 | Br | 0.102 | |
| 16 | Sr | 0.0125 | |
| 17 | B | 0.0038 | |
| 18 | Mo | <0.001 | |
| 19 | Li | <0.001 | |
| 20 | P | 0.008 | |
| 21 | Ba | 0.0022 | |
| 21 | Se | <0.001 | |
| 22 | Cr | <0.001 | |
| 23 | V | <0.001 | |
| 24 | Zn | 0.0156 | |
| 25 | As | <0.001 | |
| 26 | Yb | <0.0001 | Not detected |
| 27 | W | <0.001 | |
| 28 | Co | <0.001 | |
| 29 | Ga | <0.001 | |
| 30 | Ge | <0.001 | |
| 31 | La | <0.001 | |
| 32 | Pb | <0.001 | |
| 33 | Rb | <0.001 | |
| 34 | Sc | <0.001 | |
| 35 | Se | <0.001 | |
| 36 | Sn | <0.001 | |
| 37 | Th | <0.001 | |
| 38 | Sr | <0.001 | |
| 39 | Zr | <0.001 | |
| 40 | Be | <0.001 | |
| 41 | Ta | <0.001 | |
| 42 | Tb | <0.001 | |
| 43 | Te | <0.001 | |
| 44 | Tl | <0.001 | |
| 45 | Ag | <0.001 | |
| 46 | Hf | <0.001 | |
| 47 | Hg | <0.001 | |
| 48 | In | <0.001 | |
| 49 | Cd | <0.001 | |
| 50 | Ce | <0.001 | |
| | Total | 100.00 | |

It can be seen that purity of the magnesium ammonium phosphate hexahydrate in the struvite extracted from the seawater by using the electromagnetic ionic liquid is greater than or equal to 90%. Furthermore, the struvite also contains C, O, Na, Al, Si, S, Cl, K, Ca, Mn, Fe, Cu, Sr, B, Ba, Zn, Rb, Sc, Se, Th, Sr, Zr, Be, Ta, Tb, Tl, Ag, Hf, Ce and trace elements except for N, P, and Mg.

In addition, in a case where the struvite is extracted from salt water or brine, extracting steps are the same as those of extracting the struvite from the seawater in the above embodiments, only except that it is only necessary to adjust dosage of $NH_4HCO_3$, $H_3PO_4$ and the electromagnetic ionic liquid in proportion according to the $Mg^{2+}$ ion content in the salt water or brine.

Compared with ammonium magnesium phosphate synthesized by traditional chemical method and struvite extracted from wastewater of a sewage treatment plant, of a garbage dump, and of a livestock and poultry farm, or from sludge and the like, the struvite extracted from the seawater by using the electromagnetic ionic liquid contains potassium, calcium, sulfur and chlorine required for the crop growth and various trace elements such as molybdenum, zinc, manganese, iron, copper and selenium, and the purity and fertilizer efficiency of this struvite are higher than those of natural struvite, which is more suitable for the crop growth and convenient for industrial mass production.

It is should be appreciated by those skilled in the art that the above description and the embodiments of the invention shown in the drawings are only by way of example and do not limit the invention. The purpose of the invention has been completely and effectively achieved. The function and structural principle of the invention have been shown and explained in the embodiments; any variation and modification can be made to the embodiments of the invention without departing from the principle.

The invention claimed is:

1. An electromagnetic ionic liquid, consisting of the following components by weight (wt.):
   18.5 wt. %-48.1 wt. % of an ammonia water, wherein an original concentration of the ammonia in the ammonia water is 10 wt. %-26 wt. %,
   47.9 wt. %-77.5 wt. % of a diluent,
   1.6 wt. % of an EWT electronic water with $-300$ mV$\leq$ORP$\leq-1000$ mV and pH$\geq$13,
   2.4 wt. % of a complexing agent;
   wherein the diluent is distilled water;
   wherein the complexing agent is selected from one or more of potassium citrate, sodium citrate, potassium silicate, sodium silicate, and ethylenediaminetetraacetic acid; wherein the EWT electronic water is an aqueous solution obtained through EWT (Electronic Water Treatment) technology, and the ORP is an oxidation-reduction potential of the EWT electronic water.

2. A method for preparing an electromagnetic ionic liquid, the method comprising: mixing the following components by weight (wt.) to form the electromagnetic ionic liquid:
   18.5 wt. %-48.1 wt. % of an ammonia water, wherein an original concentration of the ammonia in the ammonia water is 10 wt. %-26 wt. %,
   47.9 wt. %-77.5 wt. % of a diluent,
   1.6 wt. % of an EWT electronic water with $-300$ mV$\leq$ORP$\leq-1000$ mV and pH$\geq$13,
   2.4 wt. % of a complexing agent;
   wherein the diluent is distilled water;
   wherein the complexing agent is selected from one or more of potassium citrate, sodium citrate, potassium silicate, sodium silicate, and ethylenediaminetetraacetic acid; wherein the EWT electronic water is an aqueous solution obtained through EWT (Electronic Water Treatment) technology, and the ORP is an oxidation-reduction potential of the EWT electronic water.

3. The method for preparing the electromagnetic ionic liquid according to claim 2, wherein in preparing the electromagnetic ionic liquid, the diluent, the complexing agent, the EWT electronic water and the ammonia water are sequentially added into a container.

4. The method for preparing the electromagnetic ionic liquid according to claim 3, wherein the electromagnetic ionic liquid is prepared and stored hermetically in a container which isolates oxygen and air and also has an insulated inner wall.

5. The method for preparing the electromagnetic ionic liquid according to claim 4, wherein the container storing the electromagnetic ionic liquid is stored at normal temperature and pressure in a ventilated, sun-shading and light-shielding site.

* * * * *